(12) United States Patent
Sadek et al.

(10) Patent No.: US 9,806,836 B2
(45) Date of Patent: Oct. 31, 2017

(54) CO-EXISTENCE-AWARE COMMUNICATION IN SHARED SPECTRUM

(71) Applicant: QUALCOMM Incorporated, San Diego, CA (US)

(72) Inventors: Ahmed Kamel Sadek, San Diego, CA (US); Nachiappan Valliappan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 77 days.

(21) Appl. No.: 14/711,384

(22) Filed: May 13, 2015

(65) Prior Publication Data

US 2016/0337063 A1 Nov. 17, 2016

(51) Int. Cl.
| | |
|---|---|
| *H04J 1/16* | (2006.01) |
| *H04J 3/16* | (2006.01) |
| *H04W 72/12* | (2009.01) |
| *H04J 3/14* | (2006.01) |
| *H04L 5/00* | (2006.01) |

(Continued)

(52) U.S. Cl.
CPC ............. *H04J 3/1694* (2013.01); *H04J 3/14* (2013.01); *H04L 5/0007* (2013.01); *H04W 72/1215* (2013.01); *H04W 74/0808* (2013.01); *H04W 88/10* (2013.01)

(58) Field of Classification Search
CPC ......... H04L 2012/5608; H04L 5/0007; H04W 84/12; H04W 88/08; H04W 80/04; H04W 88/06; H04W 84/18; H04W 72/1215; H04W 74/0808; H04W 88/10; H04B 7/212; H04B 7/2123; H04B 7/2121; H04J 3/1694; H04J 3/14

USPC .... 370/310.2, 321, 322, 328, 332, 337, 338, 370/341

See application file for complete search history.

(56) References Cited

U.S. PATENT DOCUMENTS

| | | |
|---|---|---|
| 9,332,465 B2 | 5/2016 | Valliappan et al. |
| 2010/0232380 A1 | 9/2010 | Choi et al. |
| 2013/0201884 A1 | 8/2013 | Freda et al. |

(Continued)

OTHER PUBLICATIONS

International Search Report and Written Opinion—PCT/US2016/019362—ISA/EPO—Jul. 19, 2016.

(Continued)

*Primary Examiner* — Brenda H Pham
(74) *Attorney, Agent, or Firm* — Muncy, Geissler, Olds & Lowe, P.C./QUALCOMM

(57) ABSTRACT

Techniques for co-existence between wireless Radio Access Technologies (RATs) and related operations in shared spectrum are disclosed. Operation on a communication medium shared between RATs may be managed by a transceiver configured to operate in accordance with a first RAT and to monitor the medium for signaling associated with a second RAT. A medium analyzer may be configured to determine one or more Time Division Multiplexing (TDM) parameters of a TDM communication pattern associated with the second RAT based on the monitored signaling. A transmission controller may be configured to set one or more transmission parameters for the first RAT based on the determined one or more TDM parameters. The transceiver may be further configured to transmit on the medium in accordance with the one or more transmission parameters.

49 Claims, 8 Drawing Sheets

(51) Int. Cl.
　　　*H04W 74/08*　　　(2009.01)
　　　*H04W 88/10*　　　(2009.01)

(56) References Cited

U.S. PATENT DOCUMENTS

| | | |
|---|---|---|
| 2013/0208587 A1 | 8/2013 | Bala et al. |
| 2013/0242780 A1 | 9/2013 | Dayal et al. |
| 2013/0322279 A1 | 12/2013 | Chincholi et al. |
| 2014/0198765 A1 | 7/2014 | Krishnamurthy et al. |
| 2015/0085684 A1 | 3/2015 | Sadek |
| 2015/0236782 A1* | 8/2015 | Kadous ............... H04B 7/2643 370/337 |
| 2015/0305030 A1* | 10/2015 | Sadek .................. H04W 16/14 370/336 |
| 2016/0128130 A1 | 5/2016 | Sadek et al. |

OTHER PUBLICATIONS

ZTE: "Considerations on Measurements for LAA," 3GPP Draft, R1-150151 Considerations on Measurements for LAA, 3rd Generation Partnership Project (3GPP), Mobile Competence Centre, 650, Route Des Lucioles, ; F-06921 Sophia-Antipolis Cedex ; FRA vol. RAN WG1. no. Athens. Greece; Feb. 9, 2015-Feb. 13, 2015 Feb. 8, 2015 (Feb. 8, 2015). XP050933365, Retrieved from the Internet: URL:http://www.3gpp.org/ftp/Meetings 3GPP_SYNC/RAN1/Docs/ - - [retrieved on Feb. 8, 2015] Chapter 2.2 "RRM measurement," Chapter 2.3 n CSI Measurement, 6 pages.

\* cited by examiner

CO-EXISTENCE-AWARE COMMUNICATION IN SHARED SPECTRUM

Aspects of this disclosure relate generally to telecommunications, and more particularly to co-existence between wireless Radio Access Technologies (RATs) and the like.

Wireless communication systems are widely deployed to provide various types of communication content, such as voice, data, multimedia, and so on. Typical wireless communication systems are multiple-access systems capable of supporting communication with multiple users by sharing available system resources (e.g., bandwidth, transmit power, etc.). Examples of such multiple-access systems include Code Division Multiple Access (CDMA) systems, Time Division Multiple Access (TDMA) systems, Frequency Division Multiple Access (FDMA) systems, Orthogonal Frequency Division Multiple Access (OFDMA) systems, and others. These systems are often deployed in conformity with specifications such as Long Term Evolution (LTE) provided by the Third Generation Partnership Project (3GPP), Ultra Mobile Broadband (UMB) and Evolution Data Optimized (EV-DO) provided by the Third Generation Partnership Project 2 (3GPP2), 802.11 provided by the Institute of Electrical and Electronics Engineers (IEEE), etc.

In cellular networks, "macro cell" access points provide connectivity and coverage to a large number of users over a certain geographical area. A macro network deployment is carefully planned, designed, and implemented to offer good coverage over the geographical region. To improve indoor or other specific geographic coverage, such as for residential homes and office buildings, additional "small cell," typically low-power access points have recently begun to be deployed to supplement conventional macro networks. Small cell access points may also provide incremental capacity growth, richer user experience, and so on.

Recently, small cell LTE operations, for example, have been extended into the unlicensed frequency spectrum such as the Unlicensed National Information Infrastructure (U-NII) band used by Wireless Local Area Network (WLAN) technologies. This extension of small cell LTE operation is designed to increase spectral efficiency and hence capacity of the LTE system. However, it may also encroach on the operations of other Radio Access Technologies (RATs) that typically utilize the same unlicensed bands, most notably IEEE 802.11x WLAN technologies generally referred to as "Wi-Fi."

SUMMARY

Techniques for co-existence between wireless Radio Access Technologies (RATs) and related operations in shared spectrum are disclosed.

In one example, an apparatus for managing operation on a communication medium shared between RATs is disclosed. The apparatus may include, for example, a transceiver, a medium analyzer, and a transmission controller. The transceiver may be configured to operate in accordance with a first RAT and to monitor the medium for signaling associated with a second RAT. The medium analyzer may be configured to determine one or more Time Division Multiplexing (TDM) parameters of a TDM communication pattern associated with the second RAT based on the monitored signaling. The TDM communication pattern may define activated periods and deactivated periods of communication over the medium in accordance with the second RAT. The transmission controller may be configured to set one or more transmission parameters for the first RAT based on the determined one or more TDM parameters. The transceiver may be further configured to transmit on the medium in accordance with the one or more transmission parameters.

In another example, a method for managing operation on a communication medium shared between RATs is disclosed. The method may include, for example, monitoring the medium, via a transceiver configured to operate in accordance with a first RAT, for signaling associated with a second RAT; determining one or more TDM parameters of a TDM communication pattern associated with the second RAT based on the monitored signaling, the TDM communication pattern defining activated periods and deactivated periods of communication over the medium in accordance with the second RAT; setting one or more transmission parameters for the first RAT based on the determined one or more TDM parameters; and transmitting on the medium, via the transceiver, in accordance with the one or more transmission parameters.

In another example, another apparatus for managing operation on a communication medium shared between RATs is disclosed. The apparatus may include, for example, means for monitoring the medium, in accordance with a first RAT, for signaling associated with a second RAT; means for determining one or more TDM parameters of a TDM communication pattern associated with the second RAT based on the monitored signaling, the TDM communication pattern defining activated periods and deactivated periods of communication over the medium in accordance with the second RAT; means for setting one or more transmission parameters for the first RAT based on the determined one or more TDM parameters; and means for transmitting on the medium in accordance with the one or more transmission parameters.

In another example, a transitory or non-transitory computer-readable medium including code, which, when executed by a processor, causes the processor to perform operations for managing operation on a communication medium shared between RATs is disclosed. The computer-readable medium may include, for example, code for monitoring the communication medium, in accordance with a first RAT, for signaling associated with a second RAT; code for determining one or more TDM parameters of a TDM communication pattern associated with the second RAT based on the monitored signaling, the TDM communication pattern defining activated periods and deactivated periods of communication over the communication medium in accordance with the second RAT; code for setting one or more transmission parameters for the first RAT based on the determined one or more TDM parameters; and code for transmitting on the communication medium in accordance with the one or more transmission parameters.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

The present disclosure relates generally to techniques for co-existence-aware communication on a communication medium shared between Radio Access Technologies (RATs). Inter-RAT co-existence mechanisms such as a long-term Time Division Multiplexed (TDM) communication scheme may be implemented on the medium by various systems, and these co-existence mechanisms may impact neighboring system communication in different ways. Awareness of such co-existence mechanisms by an impacted neighboring system may be used to adapt communication accordingly. For example, data rates, user scheduling, operating bandwidth, and so on, may all be adapted differently in view of different TDM communication patterns and their particular activated and deactivated periods of communication.

More specific aspects of the disclosure are provided in the following description and related drawings directed to various examples provided for illustration purposes. Alternate aspects may be devised without departing from the scope of the disclosure. Additionally, well-known aspects of the disclosure may not be described in detail or may be omitted so as not to obscure more relevant details.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., Application Specific Integrated Circuits (ASICs)), by program instructions being executed by one or more processors, or by a combination of both. In addition, for each of the aspects described herein, the corresponding form of any such aspect may be implemented as, for example, "logic configured to" perform the described action.

Figure 1:
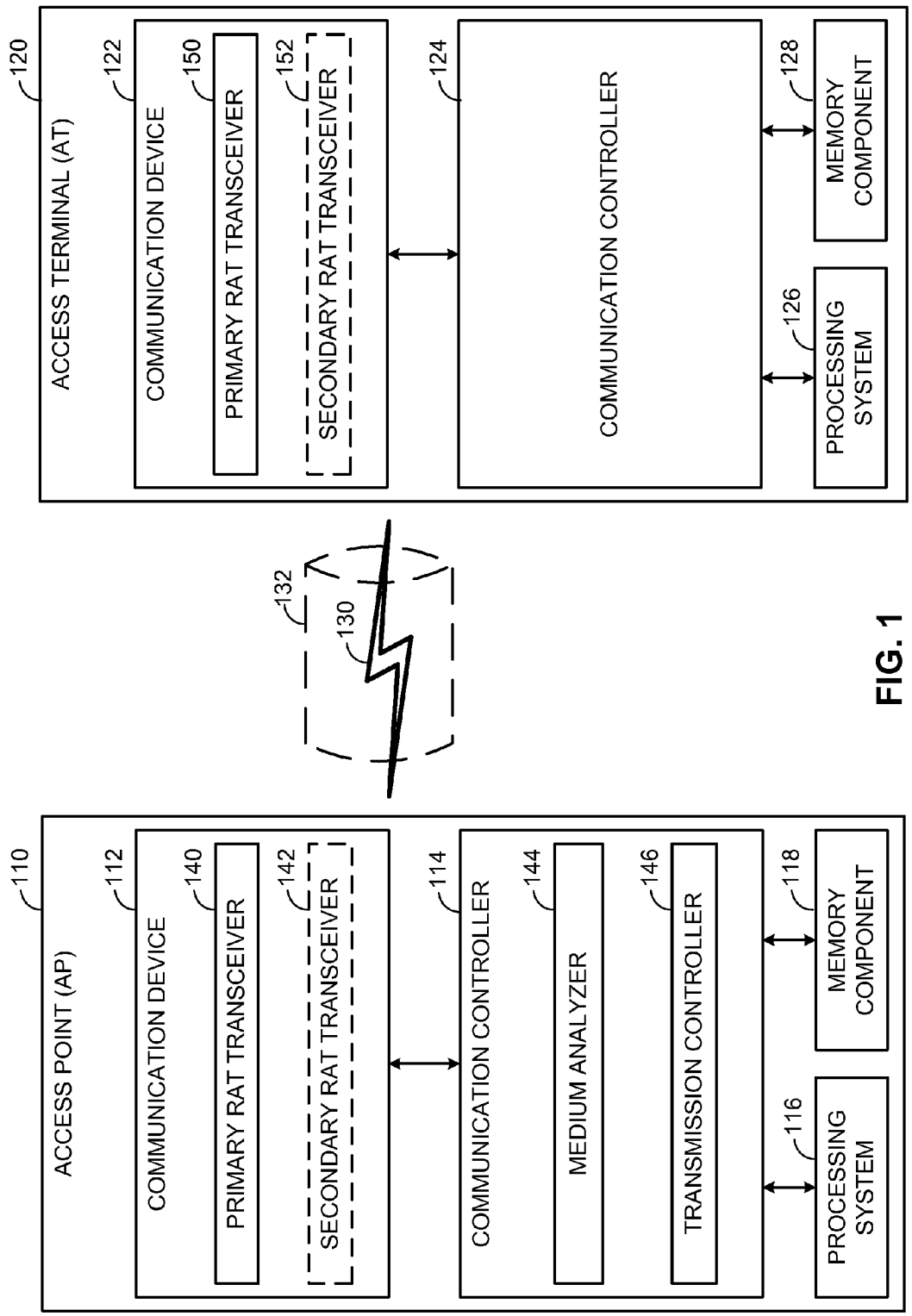
FIG. 1 illustrates an example wireless communication system including an Access Point (AP) in communication with an Access Terminal (AT).

FIG. 1 illustrates an example wireless communication system including an Access Point (AP) in communication with an Access Terminal (AT). Unless otherwise noted, the terms "access terminal" and "access point" are not intended to be specific or limited to any particular Radio Access Technology (RAT). In general, access terminals may be any wireless communication device allowing a user to communicate over a communications network (e.g., a mobile phone, router, personal computer, server, entertainment device, Internet of Things (IOT)/Internet of Everything (IOE) capable device, in-vehicle communication device, etc.), and may be alternatively referred to in different RAT environments as a User Device (UD), a Mobile Station (MS), a Subscriber Station (STA), a User Equipment (UE), etc. Similarly, an access point may operate according to one or several RATs in communicating with access terminals depending on the network in which the access point is deployed, and may be alternatively referred to as a Base Station (BS), a Network Node, a NodeB, an evolved NodeB (eNB), etc.

In the example of FIG. 1, the access point 110 and the access terminal 120 each generally include a wireless communication device (represented by the communication devices 112 and 122) for communicating with other network nodes via at least one designated RAT. The communication devices 112 and 122 may be variously configured for transmitting and encoding signals (e.g., messages, indications, information, and so on), and, conversely, for receiving and decoding signals (e.g., messages, indications, information, pilots, and so on) in accordance with the designated RAT. The access point 110 and the access terminal 120 may also each generally include a communication controller (represented by the communication controllers 114 and 124) for controlling operation of their respective communication devices 112 and 122 (e.g., directing, modifying, enabling, disabling, etc.). The communication controllers 114 and 124 may operate at the direction of or otherwise in conjunction with respective host system functionality (illustrated as the processing systems 116 and 126 and the memory components 118 and 128). In some designs, the communication controllers 114 and 124 may be partly or wholly subsumed by the respective host system functionality.

Turning to the illustrated communication in more detail, the access terminal 120 may transmit and receive messages via a wireless link 130 with the access point 110, the message including information related to various types of communication (e.g., voice, data, multimedia services, associated control signaling, etc.). The wireless link 130 may operate over a communication medium of interest, shown by way of example in FIG. 1 as the medium 132, which may be shared with other communications as well as other RATs. A medium of this type may be composed of one or more frequency, time, and/or space communication resources (e.g., encompassing one or more channels across one or more carriers) associated with communication between one or more transmitter/receiver pairs, such as the access point 110 and the access terminal 120 for the medium 132.

As a particular example, the medium 132 may correspond to at least a portion of an unlicensed frequency band shared with other RATs. In general, the access point 110 and the access terminal 120 may operate via the wireless link 130 according to one or more RATs depending on the network in which they are deployed. These networks may include, for example, different variants of Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, and so on. Although different licensed frequency bands have been reserved for such communications (e.g., by a government entity such as the Federal Communications Commission (FCC) in the United States), certain communication networks, in particular those employing small cell access points, have extended operation into unlicensed frequency bands such as the Unlicensed National Information Infrastructure (U-NII) band used by Wireless Local Area Network (WLAN) technologies, most notably IEEE 802.11x WLAN technologies generally referred to as "Wi-Fi."

In the example of FIG. 1, the communication device 112 of the access point 110 includes a primary RAT transceiver 140 configured to operate in accordance with one RAT and, in some designs (e.g., as part of a small cell access point), an optional secondary RAT transceiver 142 configured to operate in accordance with another RAT. As used herein, a "transceiver" may include a transmitter circuit, a receiver circuit, or a combination thereof, but need not provide both transmit and receive functionalities in all designs. For example, a low functionality receiver circuit may be employed in some designs to reduce costs when providing full communication is not necessary (e.g., a receiver chip or similar circuitry simply providing low-level sniffing). Further, as used herein, the term "co-located" (e.g., radios, access points, transceivers, etc.) may refer to one of various arrangements. For example, components that are in the same housing; components that are hosted by the same processor; components that are within a defined distance of one another; and/or components that are connected via an interface (e.g., an Ethernet switch) where the interface meets the latency requirements of any required inter-component communication (e.g., messaging).

The primary RAT transceiver 140 and the secondary RAT transceiver 142 may provide different functionalities and may be used for different purposes. As an example, the primary RAT transceiver 140 may operate in accordance with Wi-Fi technology to provide communication with the access terminal 120 on the wireless link 130, while the secondary RAT transceiver 142 (if equipped) may operate in accordance with Long Term Evolution (LTE) technology to monitor LTE signaling on the medium 132 that may interfere with or be interfered with by the Wi-Fi communications. The secondary RAT transceiver 142 may or may not serve as a full LTE eNB providing communication services to a corresponding network. The communication device 122 of the access terminal 120 may, in some designs, include similar primary RAT transceiver and/or secondary RAT transceiver functionality, as shown in FIG. 1 by way of the primary RAT transceiver 150 and the secondary RAT transceiver 152, although such dual-transceiver functionality may not be required.

Figure 2:
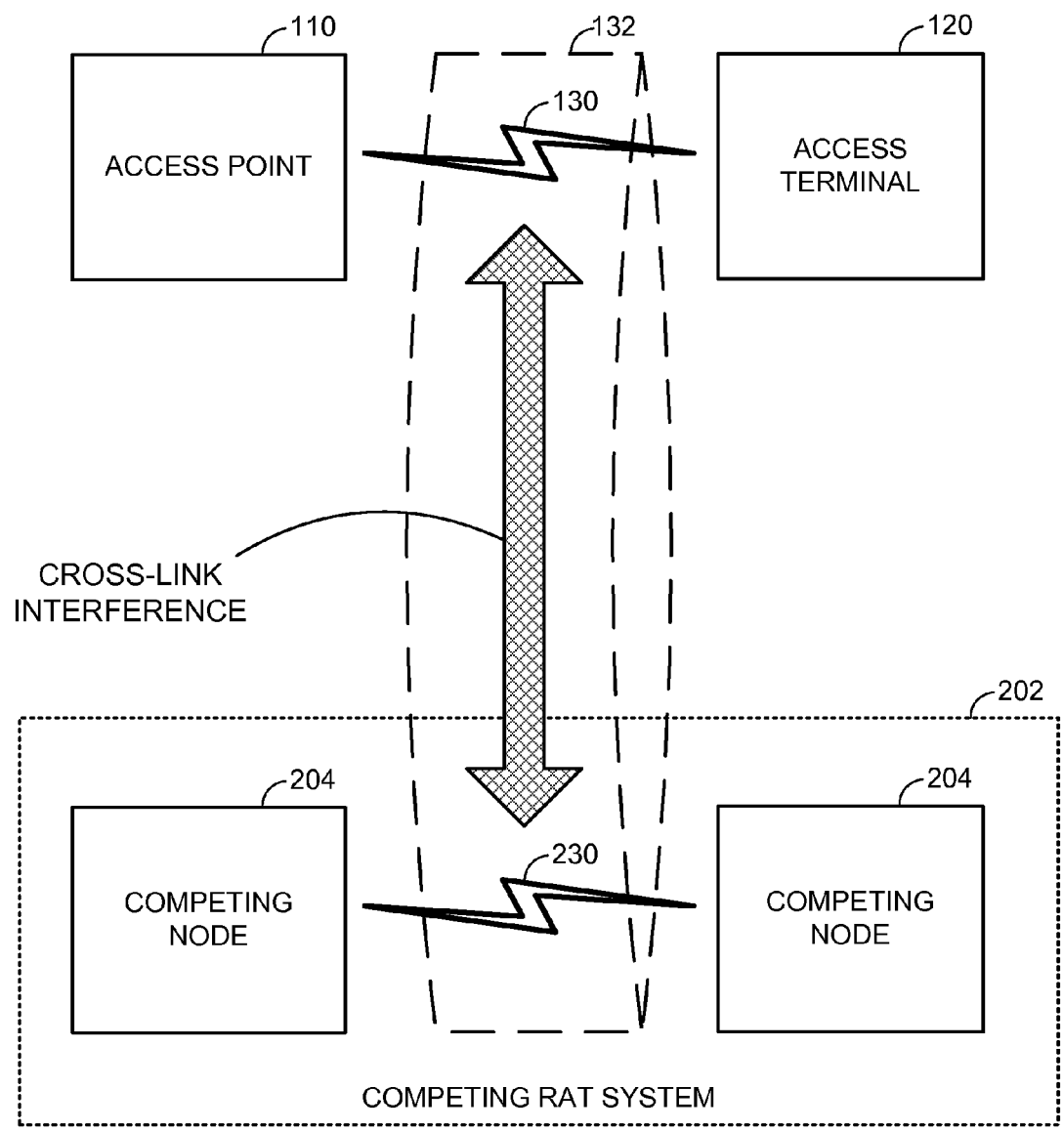
FIG. 2 is a system-level diagram illustrating cross-link interference between Radio Access Technologies (RATs) on a shared communication medium.

FIG. 2 is a system-level diagram illustrating cross-link interference between RATs on a shared communication medium such as the medium 132. In this example, the medium 132 used for communication between the access point 110 and the access terminal 120 is shared with a competing RAT system 202. The competing RAT system 202 may include one or more competing nodes 204 that communicate with each other over a respective wireless link 230 also on the medium 132. Continuing the example above, the access point 110 and the access terminal 120 may communicate via the wireless link 130 in accordance with Wi-Fi technology, for example, while the competing RAT system 202 may communicate via the wireless link 230 in accordance with LTE technology.

As shown, due to the shared use of the medium 132, there is the potential for cross-link interference between the wireless link 130 and the wireless link 230. The competing RAT system 202 may attempt to mitigate this interference with different co-existence mechanisms, which may impact the communication between the access point 110 and the access terminal 120 in different ways. One particular co-existence mechanism that the competing RAT system 202 may implement is a long-term Time Division Multiplexed (TDM) communication scheme.

Figure 3:
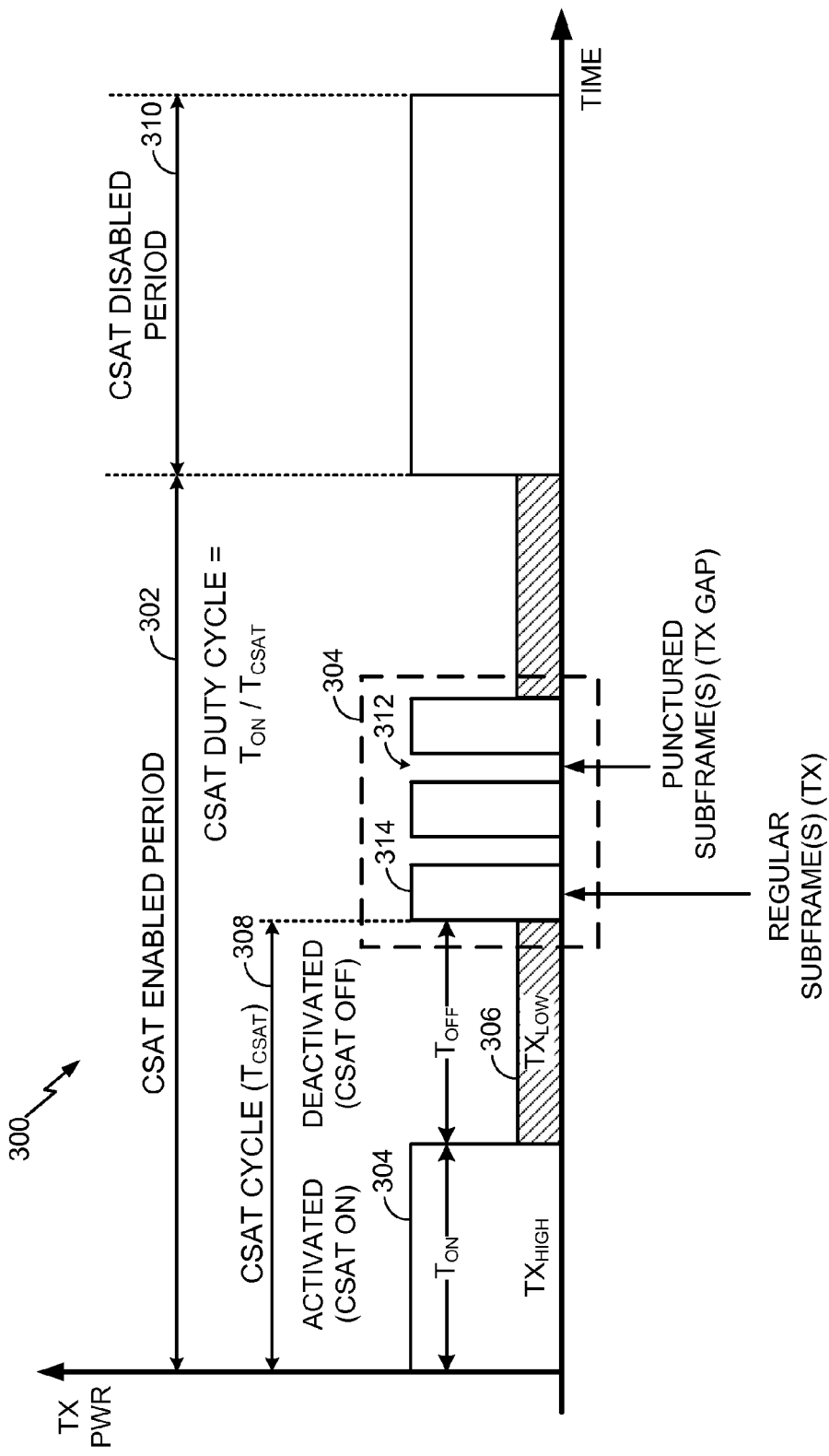
FIG. 3 illustrates certain aspects of an example long-term Time Division Multiplexing (TDM) communication scheme referred to herein as Carrier Sense Adaptive Transmission (CSAT).

FIG. 3 illustrates certain aspects of an example long-term TDM communication scheme referred to herein as Carrier Sense Adaptive Transmission (CSAT) that may be implemented by the competing RAT system 202 on the medium 132. A CSAT communication scheme may be used by the competing RAT system 202 to foster co-existence between (i) its own communications in accordance with its respective RAT and (ii) communications of neighboring devices such as the access point 110 and access terminal 120 in accordance with another RAT. As shown, a CSAT communication scheme may create a pattern of utilization of the medium 132 by the competing RAT system 202 in accordance with a TDM communication pattern 300.

In more detail, during a CSAT enabled period 302, utilization of the medium 132 by the competing RAT system 202 may be cycled over time between activated (CSAT ON) periods 304 and deactivated (CSAT OFF) periods 306. A given activated period 304/deactivated period 306 pair may constitute a CSAT cycle ($T_{CSAT}$) 308. During a period of time $T_{ON}$ associated with each activated period 304 (as well as any CSAT disabled periods 310), transmission on the medium 132 by the competing RAT system 202 may proceed at a normal, relatively high transmission power. During a period of time $T_{OFF}$ associated with each deactivated period 306, however, transmission on the medium 132 by the competing RAT system 202 is reduced or even fully disabled to yield the medium 132 to neighboring devices such as the access point 110 and access terminal 120. In some instances, a given activated period 304 may be gated to introduce short transmissions gaps in the waveform. For example, in the context of FIG. 3, a given activated period 304 may be gated at different subframes, also called punctured subframes 312, serving as transmission gaps between regular subframes 314. In different deployments and at different times, the TDM communication pattern 300 may be characterized by different associated CSAT parameters, including, for example, different periodicities ($T_{CSAT}$), different duty cycles (i.e., $T_{ON}/T_{CSAT}$), different respective transmission powers during activated periods 304 and deactivated periods 306, different puncturing patterns within a given activated period 304, and so on.

Returning to FIG. 1 and as will be discussed in more detail below with reference to FIGS. 4-6, the communication controller 114 of the access point 110 may include a medium analyzer 144 and a transmission controller 146, which may operate in conjunction with the primary RAT transceiver 140 and/or the secondary RAT transceiver 142 to manage operation on the medium 132 in view of a long-term TDM communication scheme such as CSAT. In addition or as an alternative, in some designs, the communication controller 124 of the access terminal 120 may include similar or complimentary components (not shown), although this is not required.

Figure 4:
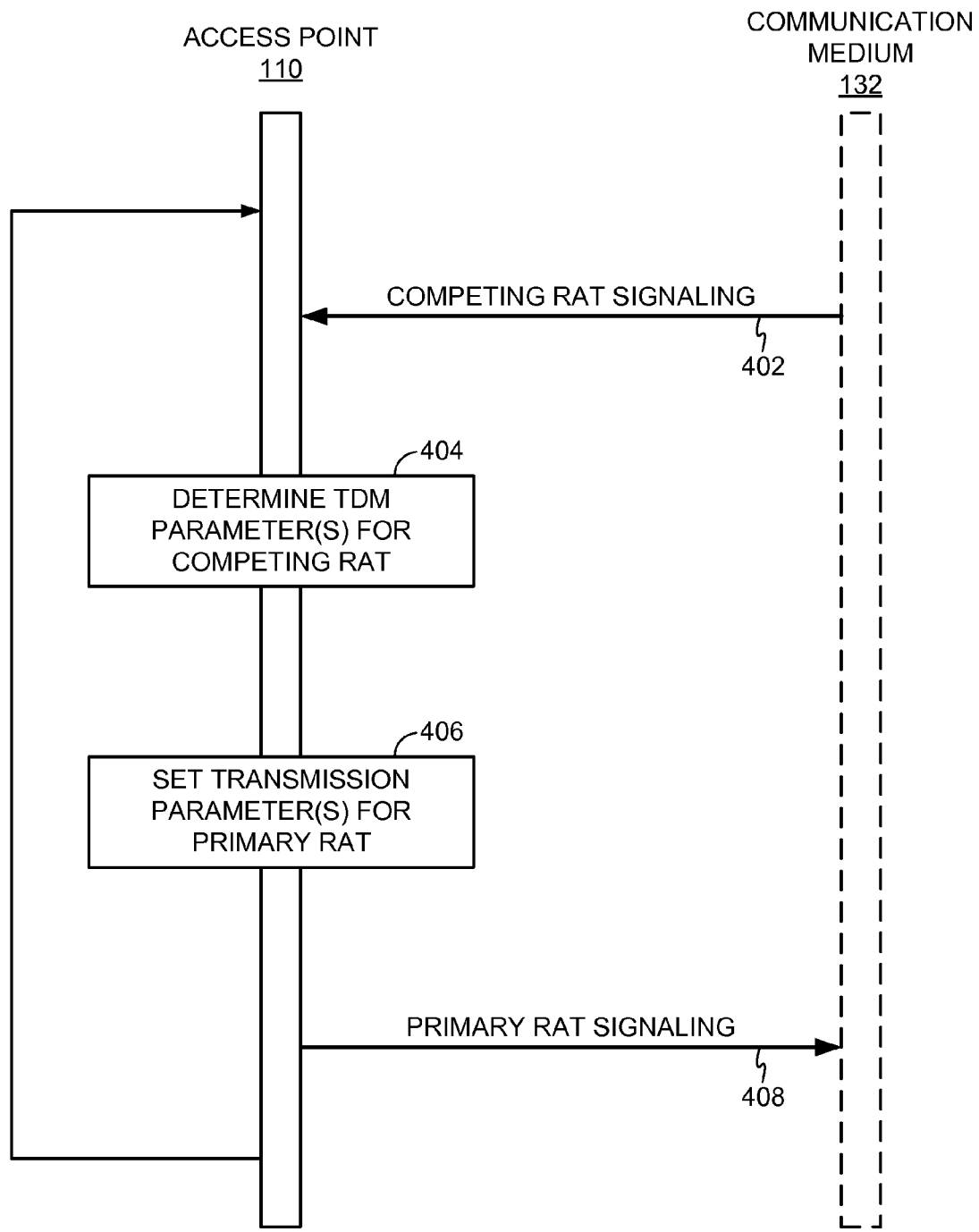
FIG. 4 is a signaling flow diagram illustrating an example TDM-aware procedure for managing operation on a communication medium shared between RATs.

FIG. 4 is a signaling flow diagram illustrating an example TDM-aware procedure for managing operation on a communication medium shared between RATs. In this example, the access point 110 manages operation on the medium 132, where the competing RAT system 202 is implementing a long-term TDM communication scheme such as CSAT.

In more detail and with reference to the components illustrated in FIG. 1, the primary RAT transceiver 140 of the access point 110, which is configured to operate in accordance with a primary RAT (such as Wi-Fi), initially monitors the medium 132 for signaling 402 associated with the competing RAT system 202 (e.g., LTE signaling). Based on the monitored signaling 402, the medium analyzer 144 may determine (block 404) one or more TDM parameters of a TDM communication pattern such as the CSAT TDM communication pattern 300 of FIG. 3 that are associated with the RAT utilized by the competing RAT system 202.

If equipped, the secondary RAT transceiver 142 may be used to perform the monitoring directly when configured to operate in accordance with the same RAT as the competing RAT system 202. This may simplify pattern discovery. However, it is not necessary that the secondary RAT transceiver 142 be equipped or utilized, as various inter-RAT discovery mechanisms may be used by the medium analyzer 144 to determine different TDM parameters via the primary RAT transceiver 140.

As an example, the primary RAT transceiver 140 may monitor the medium 132 for other (non-primary-RAT) signaling energy (e.g., a Fast Fourier Transform (FFT) energy output) and compare the monitored signaling energy to a known waveform signature (which may also be referred to as a "fingerprint") corresponding to the RAT of the competing RAT system 202. This may help to discern the source of the signaling and associate it with the RAT of the competing RAT system 202 as opposed to some other source. In LTE, for example, certain downlink signals such as Primary Synchronization Signals (PSS), Secondary Synchronization Signals (SSS), and Cell-specific Reference Signals (CRS), as well as certain uplink signals such as Physical Uplink Control Channel (PUCCH) signals, are each broadcast with a characteristic periodicity that can be used to define such a waveform signature. Since the primary RAT transceiver 140 will not in general be synced with the subframe boundary of the RAT used by the competing RAT system 202, an appropriate measurement interval may be selected and repeated (based on the corresponding frame structure or the like) to more accurately capture useful signaling energy information. In some designs, signaling energy measurements may be aggregated over multiple frame duration periods, for example, with random time offsets for more confidence.

As another example, the primary RAT transceiver 140 may monitor the medium 132 for other (non-primary-RAT) signaling energy and correlate the monitored signaling energy with a channel reservation message defined for the primary RAT. This may also help to discern the source of the signaling and associate it with the RAT of the competing RAT system 202 as opposed to some other source. For example, some competing RATs have begun to co-opt certain intra-RAT interference mitigation protocols to facilitate one or more of their own co-existence schemes. The competing RAT system 202 may in some instances utilize channel reservation messaging defined by other RATs such as Wi-Fi to reserve the medium 132 and prevent neighboring Wi-Fi devices from transmitting for a reserved duration. Example channel reservation messages may include, for example, Clear-to-Send-to-Self (CTS2S) messages, Request-to-Send (RTS) messages, Clear-to-Send (CTS) messages, Physical Layer Convergence Protocol (PLCP) Signal (SIG) headers (e.g., L-SIG, HT-SIG, VHT-SIG), and the like for a Wi-Fi RAT, or other similar messages defined for other RATs. By correlating the monitored signaling energy with a given channel reservation message, the primary RAT transceiver 140 may be able to identify the channel reservation message and the signaling as being associated specifically with the RAT of the competing RAT system 202.

Once the signaling is determined to be associated with the RAT of the competing RAT system 202, the medium analyzer 144 may use it for the determination (block 404) of any relevant TDM parameters utilized by the competing RAT system 202. As an example, the medium analyzer 144 may analyze the spacing between the monitored signaling 402 to determine a parameter that defines or is otherwise related to a periodicity of the TDM communication pattern (e.g., $T_{CSAT}$ for the CSAT communication pattern 300 in FIG. 3). As another example, the medium analyzer 144 may analyze the spacing between the monitored signaling 402 to determine a parameter that defines or is otherwise related to a duty cycle of the activated periods of the TDM communication pattern (e.g., $T_{ON}/T_{CSAT}$ for the CSAT communication pattern 300 in FIG. 3). As another example, the medium analyzer 144 may analyze the spacing between the monitored signaling 402 to determine a parameter that defines or is otherwise related to a puncturing pattern within a given activated period of the TDM communication pattern (e.g., the location of punctured subframes 312 for the CSAT communication pattern 300 in FIG. 3).

The medium analyzer 144 may analyze the spacing between the monitored signaling 402 in different ways. As an example, the medium analyzer 144 may observe the timing pattern of a channel assessment busy/clear indicator for non-primary RAT signaling energy or the like. The Wi-Fi IEEE 802.11 protocol family of standards, for example, provides a Clear Channel Assessment (CCA) mechanism for assessing the state of the communication medium prior to attempting transmission, including comparisons of other-RAT signaling to a CCA-ED threshold (e.g., −62 dBm for a Wi-Fi primary channel). The medium analyzer 144 may observe the timing pattern of the CCA-ED busy/clear indicator when the competing RAT system 202 is in relative proximity (such that the monitored signaling 402 is above the CCA-ED threshold during active periods of transmission). As another example, the medium analyzer 144 may decode the duration field of any associated channel reservation messages (e.g., the duration field of a CTS2S message identified as being associated with the competing RAT system 202).

Returning to FIG. 4, based on the determined one or more TDM parameters, the transmission controller 146 may set (block 406) one or more transmission parameters for the primary RAT, and the primary RAT transceiver 140 may thereafter transmit primary RAT signaling 408 on the medium 132 in accordance with the one or more transmission parameters. Relevant transmission parameters may include, for example, Physical (PHY) layer parameters (e.g., data rate, bandwidth, Modulation and Coding Scheme (MCS), etc.), Medium Access Control (MAC) layer parameters (e.g., retransmission counts, user scheduling, etc.), and so on.

As a particular example, the transmission controller 146 may set one or more bandwidth management parameters for controlling bandwidth utilization and/or scheduling by the access point 110. For example, the transmission controller 146 may set the bandwidth management parameters to direct the primary RAT transceiver 140 to use a first, relatively small bandwidth during an activated period of the TDM communication pattern implemented by the competing RAT system 202, and a second, relatively large bandwidth during a deactivated period of the TDM communication pattern. In addition or as an alternative, the transmission controller 146 may set the bandwidth management parameters to direct the primary RAT transceiver 140 to send a packet having a relatively high priority (e.g., above a quantitative or qualitative threshold), such as packets for latency-sensitive traffic, over a restricted portion of the medium 132 during an activated period of the TDM communication pattern.

Figure 5:
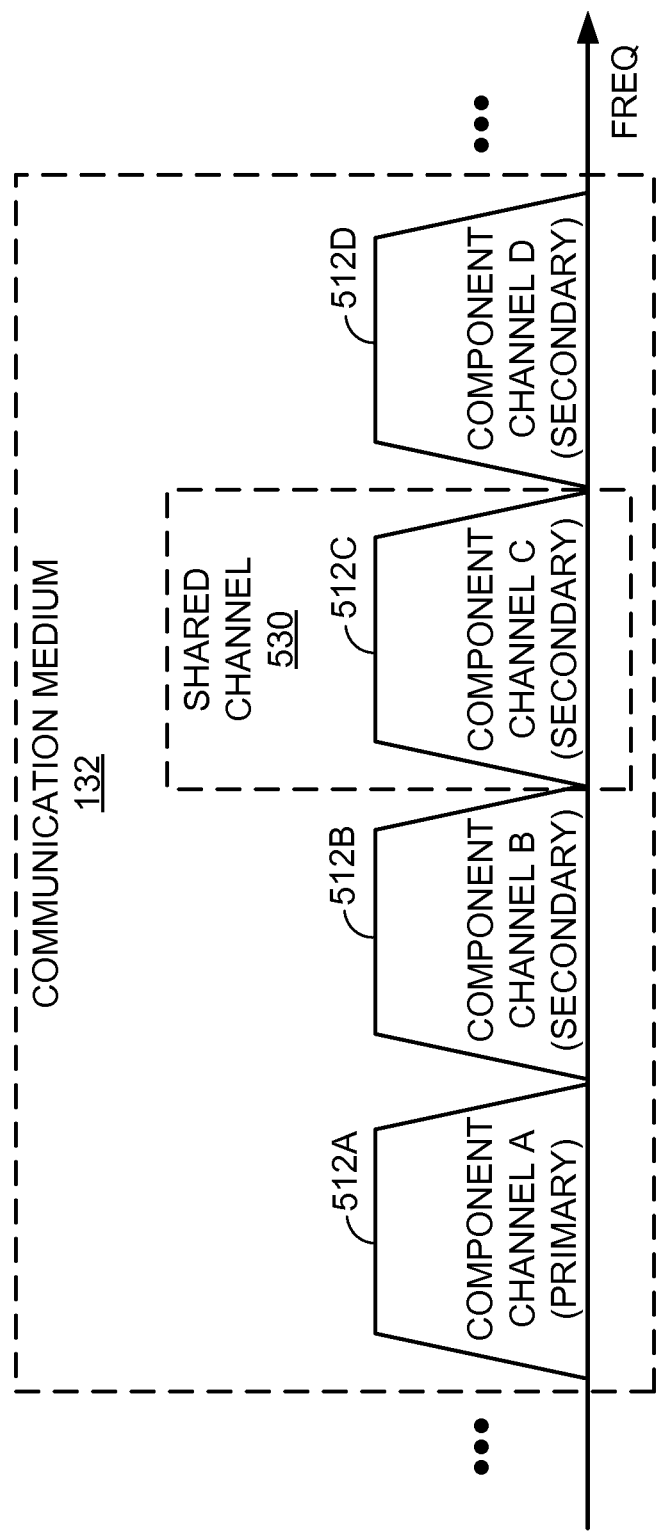
FIG. 5 is a frequency space diagram illustrating an example bandwidth division of a communication medium.

FIG. 5 is a frequency space diagram illustrating an example bandwidth division of a communication medium such as the medium 132. In this example, the medium 132 spans component channels 512A-512D. As shown, each of the component channels 512A-512D may correspond to what may be generally referred to as "primary" or "secondary" channels. For example, the Wi-Fi IEEE 802.11 protocol family of standards provides for operation of a primary 20 MHz channel as well as optionally using secondary adjacent channels (e.g., extension channels) spaced ±20 MHz away. The secondary channels may be used for channel bonding to increase the Wi-Fi bandwidth to, for example, 40 MHz, 80 MHz, or 160 MHz. In the scenario where a Wi-Fi AP is using channel bonding of two 20 MHz channels to form a 40 MHz channel, or four 20 MHz channels to form an 80 MHz channel, and so on, one of the 20 MHz channels will be specified as a primary channel (e.g., channel 512A in FIG. 5) and the rest of the channels as secondary channels (e.g., channels 512B-512D in FIG. 5). Primary channels are generally used for serving legacy access terminals, sending beacons, exchanging connection setup exchanges (e.g., association and authentication), etc.

In the illustrated example, the competing RAT system 202 may only intend to occupy or otherwise make use of one of the component channels (shown as a shared channel 530, corresponding to component channel 512C in FIG. 5). Accordingly, with knowledge of the activated periods of the TDM communication pattern implemented by the competing RAT system 202, the transmission controller 146 may reduce the bandwidth occupied by the wireless link 130 so as to exclude the shared channel 530 during the activated periods. The bandwidth may be reduced, for example, to only a primary channel (e.g., the primary channel 512A in FIG. 5) or to a primary channel plus one or more available (e.g., contiguous and unoccupied) secondary channels (e.g., the primary channel 512A plus the secondary channel 512B in FIG. 5). During the deactivated periods of the TDM communication pattern, the transmission controller 146 may increase the bandwidth occupied by the wireless link 130 back to its normal state.

Moreover, the transmission controller 146 may schedule higher priority traffic (e.g., traffic having a Quality of Service (QoS) class above a threshold) on only the primary channel 512A instead of the entire bandwidth, which is prone to larger contention times and more frequent collisions. In Wi-Fi, for example, packet priority can be inferred from an access class (AC) marking in the QoS Info field of an 802.11 MAC header.

Returning to FIG. 4, as another particular example of the transmission parameter management, the transmission controller 146 may maintain a dual set of transmission parameters including (i) a first, activated period set of transmission parameters for the activated periods of the TDM communication pattern implemented by the competing RAT system 202 and (ii) a second set of transmission parameters for the deactivated periods of the TDM communication pattern.

Figure 6:
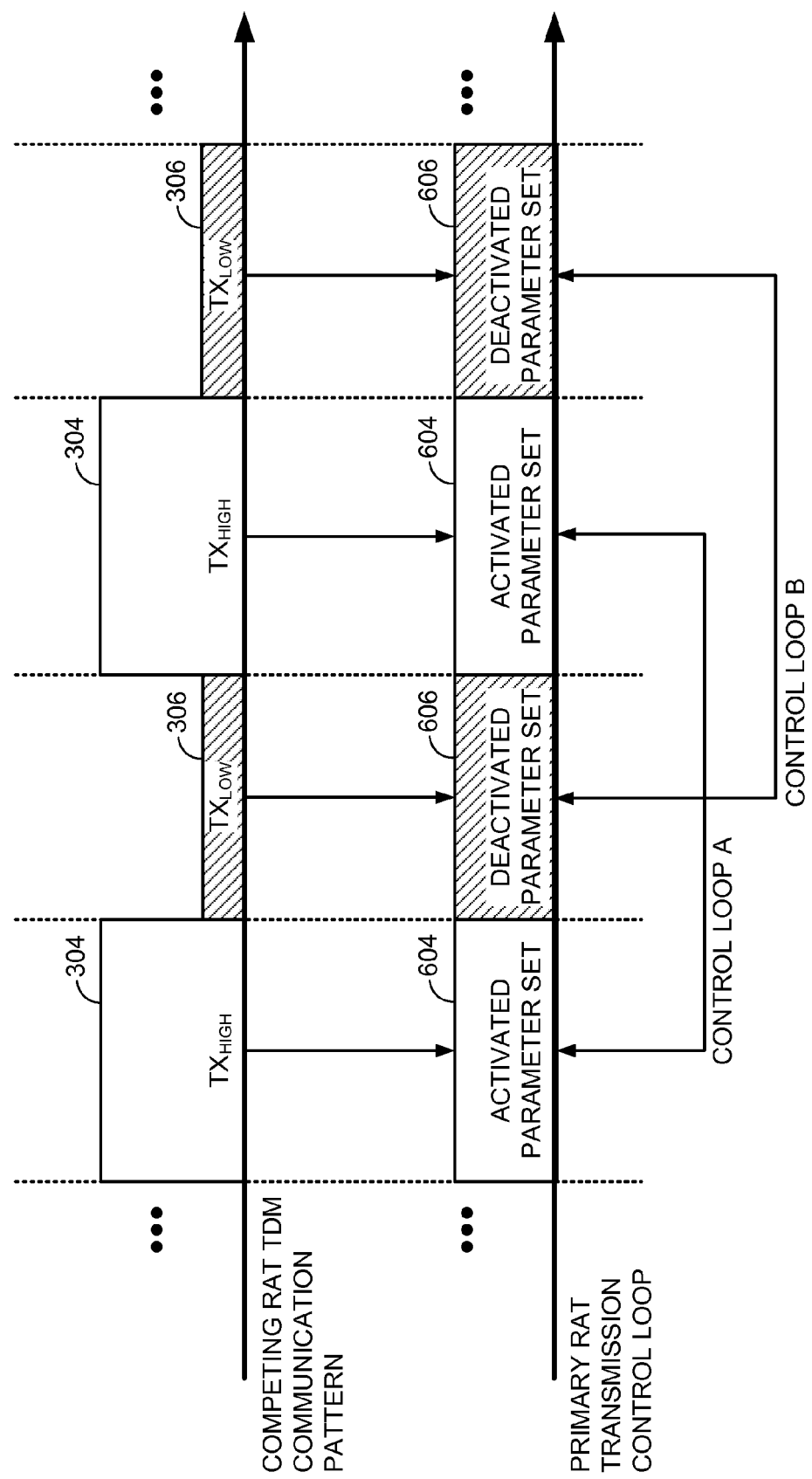
FIG. 6 is a timing diagram illustrating an example dual transmission parameter set managed in accordance with a competing RAT TDM communication pattern.

FIG. 6 is a timing diagram illustrating an example dual transmission parameter set managed in accordance with a competing RAT TDM communication pattern. In this example, the competing RAT TDM communication pattern is formed as a series of the activated periods 304 and deactivated periods 306 described in more detail above with reference to FIG. 3.

As shown, the transmission controller 146 may maintain both an activated parameter set 604 and a deactivated parameter set 606. The activated parameter set 604 may track and include parameters appropriate for transmission during activated periods 304 when interference by the competing RAT system 202 is relatively high, and the deactivated parameter set 606 may track and include parameters appropriate for transmission during deactivated periods 306 when interference by the competing RAT system 202 is relatively low. To maintain these different parameter sets, the transmission controller 146 may operate two separate tracking loops, shown by way of illustration as Control Loop A and Control Loop B, during the respective time periods.

Use of separate and interference-level appropriate parameter sets may be beneficial in several respects. For example, maintaining different data rates or MCSs for activated periods 304 as compared to deactivated periods 306 may provide better throughput and reduce ramp-up/ramp-down inefficiencies. Similarly, maintaining retransmission counts for activated periods 304 as compared to deactivated periods 306 may provide better medium access control. Still further, maintaining different user scheduling for activated periods 304 as compared to deactivated periods 306 may provide increased system efficiency (e.g., by scheduling only nearby access terminals with better Signal-to-Noise Ratios (SNRs) during activated periods 304).

Figure 7:
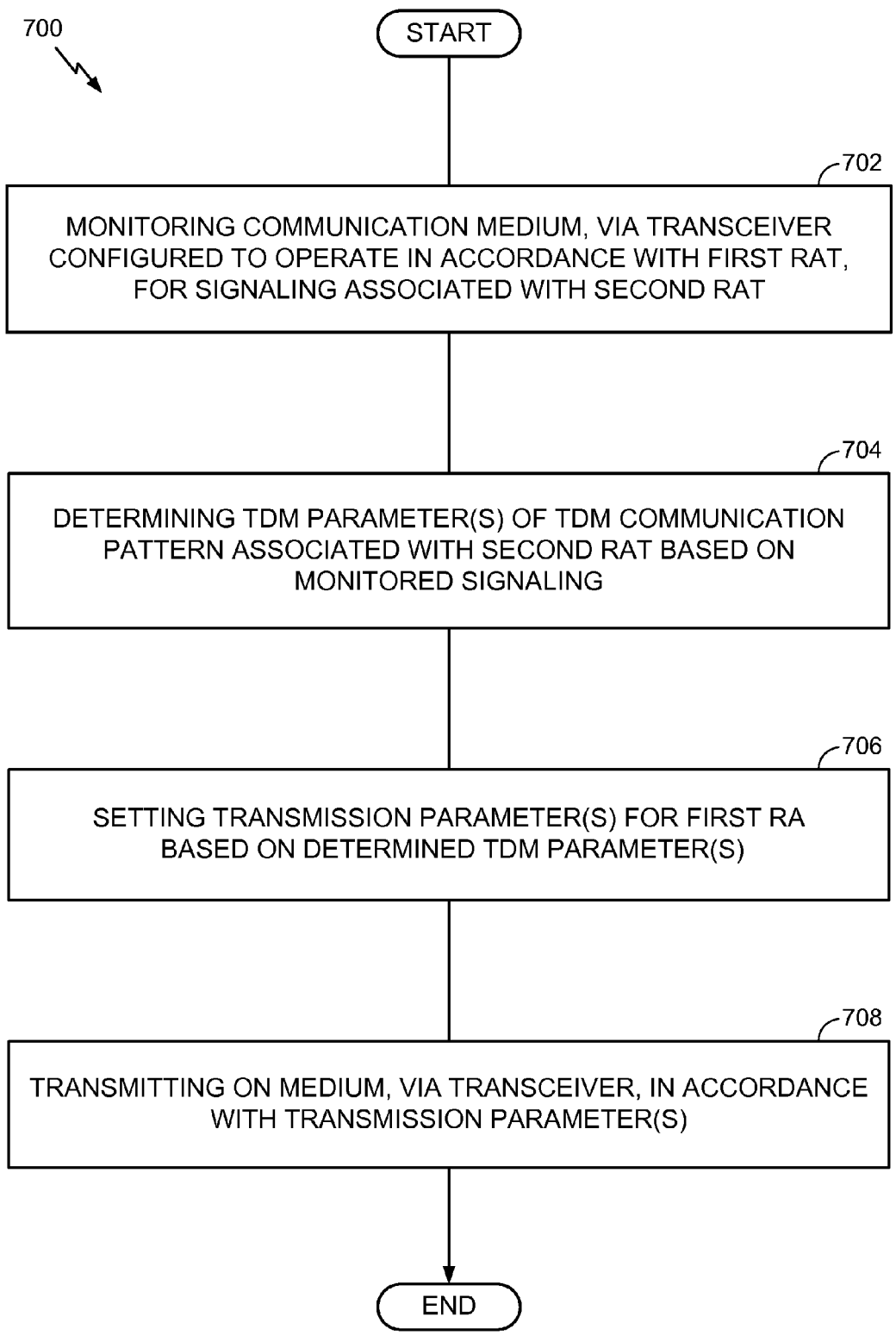
FIG. 7 is a flow diagram illustrating an example method of managing operation on a communication medium shared between RATs.

FIG. 7 is a flow diagram illustrating an example method of managing operation on a communication medium shared between RATs in accordance with the techniques described above. The method 700 may be performed, for example, by an access point (e.g., the access point 110 illustrated in FIG. 1).

As shown, the access point may monitor (block 702) the medium (e.g., one or more time, frequency, or space resources on an unlicensed radio frequency band), via a transceiver configured to operate in accordance with a first RAT (e.g., Wi-Fi), for signaling associated with a second RAT (e.g., LTE). The monitoring may be performed, for example, by a transceiver such as the primary RAT transceiver 140 or the like. Based on the monitored signaling, the access point may determine (block 704) one or more TDM parameters of a TDM communication pattern associated with the second RAT. As described in more detail above with reference to FIG. 3, for example, the TDM communication pattern may define activated periods and deactivated periods of communication over the medium in accordance with the second RAT. The determining may be performed, for example, by a medium analyzer such as the medium analyzer 144 or the like. The access point may set (block 706) one or more transmission parameters for the first RAT based on the determined one or more TDM parameters. The setting may be performed, for example, by a transmission controller such as the transmission controller 146 or the like. The access point may then transmit (block 708) on the medium, via the transceiver, in accordance with the one or more transmission parameters. The transmitting may be performed, for example, by a transceiver such as the primary RAT transceiver 140 or the like.

As discussed in more detail above, the one or more TDM parameters may include, for example, a parameter related to a periodicity of the TDM communication pattern, a parameter related to a duty cycle of the activated periods of the TDM communication pattern, or a combination thereof. The one or more TDM parameters may also include a parameter related to a puncturing pattern within a given activated period of the TDM communication pattern.

The monitoring (block 702) may include, for example, monitoring the medium for non-first-RAT signaling energy, and comparing the monitored non-first-RAT signaling energy with a known waveform signature corresponding to the second RAT to associate the signaling with the second RAT. In addition or as an alternative, the monitoring (block 702) may also include, for example, monitoring the medium for non-first-RAT signaling energy, and correlating the monitored non-first-RAT signaling energy with a channel reservation message defined for the first RAT to associate the signaling with the second RAT. Here, the determining (block 704) may include determining a duty cycle TDM parameter based on a duration field of the channel reservation message.

The one or more transmission parameters may include, for example, a data rate parameter, an MCS parameter, a user scheduling parameter, or a combination thereof. The one or more transmission parameters may also include one or more bandwidth management parameters for the first RAT. Here, the setting (block 706) may include, for example, setting the one or more bandwidth management parameters to direct the transceiver to use a first bandwidth during an activated period of the TDM communication pattern and a second bandwidth during a deactivated period of the TDM communication pattern, with the first bandwidth being smaller than the second bandwidth. In addition or as an alternative, the setting (block 706) may also include setting the one or more bandwidth management parameters to direct the transceiver to send a packet having a priority above a threshold over a restricted portion of the medium during an activated period of the TDM communication pattern.

In some designs, the setting (block 706) may include maintaining (i) a first set of transmission parameters for the activated periods of the TDM communication pattern and (ii) a second set of transmission parameters for the deactivated periods of the TDM communication pattern.

For convenience, the access point 110 and the access terminal 120 are shown in FIG. 1 as including various components that may be configured according to the various examples described herein. It will be appreciated, however, that the illustrated blocks may be implemented in various ways. In some implementations, the components of FIG. 1 may be implemented in one or more circuits such as, for example, one or more processors and/or one or more ASICs (which may include one or more processors). Here, each circuit may use and/or incorporate at least one memory component for storing information or executable code used by the circuit to provide this functionality.

Figure 8:
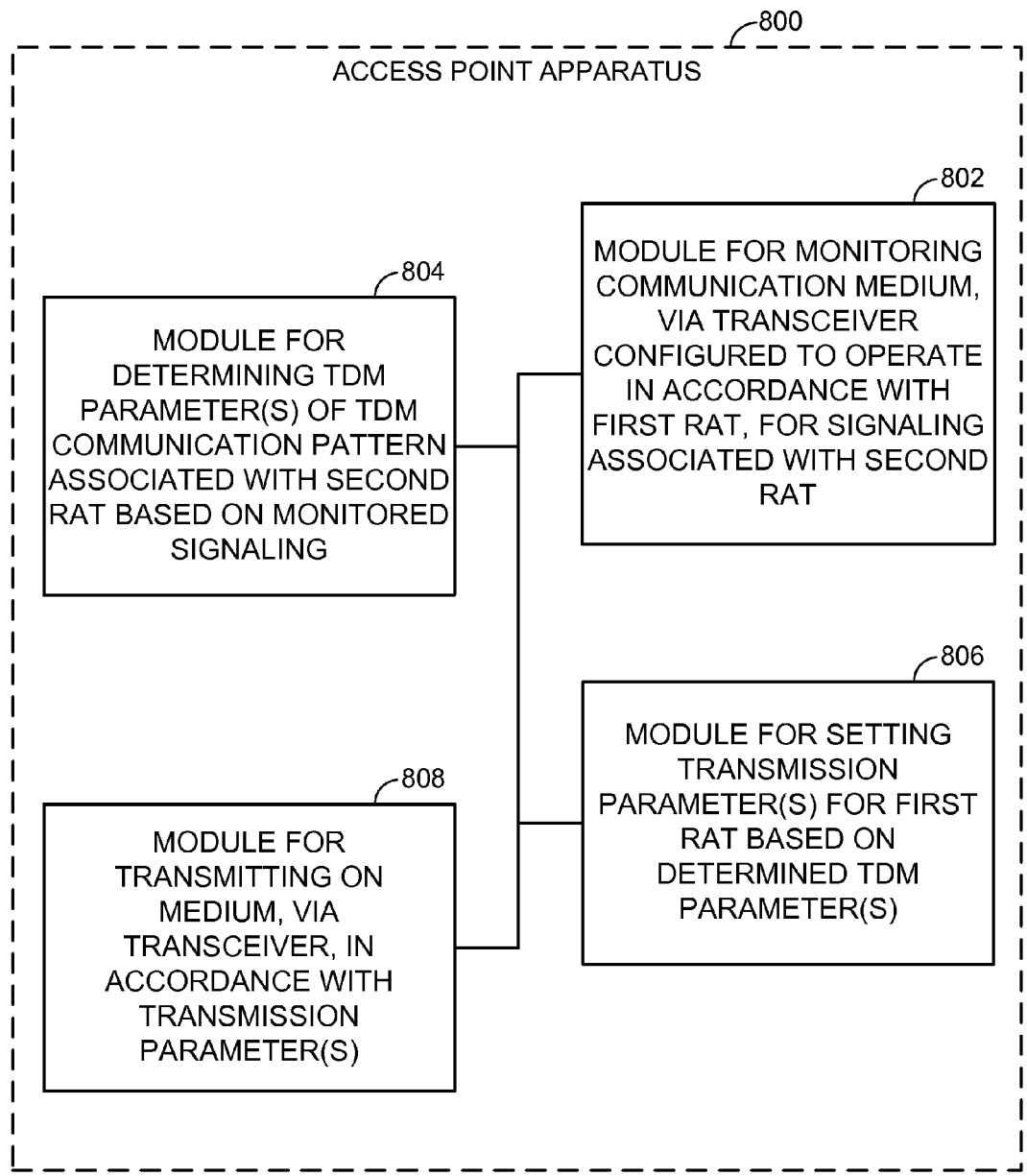
FIG. 8 illustrates an example access point apparatus represented as a series of interrelated functional modules.

FIG. 8 provides an alternative illustration of apparatuses for implementing the access point 110 and/or the access terminal 120 represented as a series of interrelated functional modules.

FIG. 8 illustrates an example access point apparatus 800 represented as a series of interrelated functional modules. A module for monitoring 802 may correspond at least in some aspects to, for example, a communication device or a component thereof as discussed herein (e.g., the communication device 112 or the like). A module for determining 804 may correspond at least in some aspects to, for example, a communication controller or a component thereof as discussed herein (e.g., the communication controller 114 or the like). A module for setting 806 may correspond at least in some aspects to, for example, a communication controller or a component thereof as discussed herein (e.g., the communication controller 114 or the like). A module for transmitting 808 may correspond at least in some aspects to, for example, a communication device or a component thereof as discussed herein (e.g., the communication device 112 or the like).

The functionality of the modules of FIG. 8 may be implemented in various ways consistent with the teachings herein. In some designs, the functionality of these modules may be implemented as one or more electrical components. In some designs, the functionality of these blocks may be implemented as a processing system including one or more processor components. In some designs, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it will be appreciated that a given subset (e.g., of an integrated circuit and/or of a set of software modules) may provide at least a portion of the functionality for more than one module.

In addition, the components and functions represented by FIG. 8, as well as other components and functions described herein, may be implemented using any suitable means. Such means also may be implemented, at least in part, using corresponding structure as taught herein. For example, the components described above in conjunction with the "module for" components of FIG. 8 also may correspond to similarly designated "means for" functionality. Thus, in some aspects one or more of such means may be implemented using one or more of processor components, integrated circuits, or other suitable structure as taught herein.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

In view of the descriptions and explanations above, one skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Accordingly, it will be appreciated, for example, that an apparatus or any component of an apparatus may be configured to (or made operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

Moreover, the methods, sequences, and/or algorithms described in connection with the aspects disclosed herein may be embodied directly in hardware, in a software module executed by a processor, or in a combination of the two. A software module may reside in Random-Access Memory (RAM), flash memory, Read-only Memory (ROM), Erasable Programmable Read-only Memory (EPROM), Electrically Erasable Programmable Read-only Memory (EEPROM), registers, hard disk, a removable disk, a CD-ROM, or any other form of storage medium known in the art, transitory or non-transitory. An exemplary storage medium is coupled to the processor such that the processor can read information from, and write information to, the storage medium. In the alternative, the storage medium may be integral to the processor (e.g., cache memory).

Accordingly, it will also be appreciated, for example, that certain aspects of the disclosure can include a transitory or non-transitory computer-readable medium embodying a method for managing operation on a communication medium shared between RATs.

While the foregoing disclosure shows various illustrative aspects, it should be noted that various changes and modifications may be made to the illustrated examples without departing from the scope defined by the appended claims. The present disclosure is not intended to be limited to the specifically illustrated examples alone. For example, unless otherwise noted, the functions, steps, and/or actions of the method claims in accordance with the aspects of the disclosure described herein need not be performed in any particular order. Furthermore, although certain aspects may be described or claimed in the singular, the plural is contemplated unless limitation to the singular is explicitly stated.

What is claimed is:

1. An apparatus for managing operation on a communication medium shared between Radio Access Technologies (RATs), comprising:
    a transceiver configured to operate in accordance with a first RAT and to monitor the medium for signaling associated with a second RAT;
    a medium analyzer configured to determine one or more Time Division Multiplexing (TDM) parameters of a TDM communication pattern associated with the second RAT based on the monitored signaling, the TDM communication pattern defining activated periods and deactivated periods of communication over the medium in accordance with the second RAT; and
    a transmission controller configured to set one or more transmission parameters for the first RAT based on the determined one or more TDM parameters,
    wherein the transceiver is further configured to transmit on the medium in accordance with the one or more transmission parameters.

2. The apparatus of claim 1, wherein the one or more TDM parameters include a parameter related to a periodicity of the TDM communication pattern, a parameter related to a duty cycle of the activated periods of the TDM communication pattern, or a combination thereof.

3. The apparatus of claim 1, wherein the one or more TDM parameters include a parameter related to a puncturing pattern within a given activated period of the TDM communication pattern.

4. The apparatus of claim 1, wherein the transceiver is configured to monitor the medium for non-first-RAT signaling energy and to compare the monitored non-first-RAT signaling energy with a known waveform signature corresponding to the second RAT to associate the signaling with the second RAT.

5. The apparatus of claim 1, wherein the transceiver is configured to monitor the medium for non-first-RAT signaling energy and to correlate the monitored non-first-RAT signaling energy with a channel reservation message defined for the first RAT to associate the signaling with the second RAT.

6. The apparatus of claim 5, wherein the medium analyzer is configured to determine a duty cycle TDM parameter based on a duration field of the channel reservation message.

7. The apparatus of claim 1, wherein the one or more transmission parameters include a data rate parameter, a Modulation and Coding Scheme (MCS) parameter, a user scheduling parameter, or a combination thereof.

8. The apparatus of claim 1, wherein the one or more transmission parameters include one or more bandwidth management parameters for the first RAT.

9. The apparatus of claim 8, wherein the transmission controller is configured to set the one or more bandwidth management parameters to direct the transceiver to use a first bandwidth during an activated period of the TDM communication pattern and a second bandwidth during a deactivated period of the TDM communication pattern, the first bandwidth being smaller than the second bandwidth.

10. The apparatus of claim 8, wherein the transmission controller is configured to set the one or more bandwidth management parameters to direct the transceiver to send a packet having a priority above a threshold over a restricted portion of the medium during an activated period of the TDM communication pattern.

11. The apparatus of claim 1, wherein the transmission controller is configured to maintain (i) a first set of transmission parameters for the activated periods of the TDM communication pattern and (ii) a second set of transmission parameters for the deactivated periods of the TDM communication pattern.

12. The apparatus of claim 1, wherein:
    the medium comprises one or more time, frequency, or space resources on an unlicensed radio frequency band;
    the first RAT comprises Wi-Fi technology; and
    the second RAT comprises Long Term Evolution (LTE) technology.

13. A method for managing operation on a communication medium shared between Radio Access Technologies (RATs), comprising:
    monitoring the medium, via a transceiver configured to operate in accordance with a first RAT, for signaling associated with a second RAT;
    determining one or more Time Division Multiplexing (TDM) parameters of a TDM communication pattern associated with the second RAT based on the monitored signaling, the TDM communication pattern defining activated periods and deactivated periods of communication over the medium in accordance with the second RAT;

setting one or more transmission parameters for the first RAT based on the determined one or more TDM parameters; and transmitting on the medium, via the transceiver, in accordance with the one or more transmission parameters.

14. The method of claim 13, wherein the one or more TDM parameters include a parameter related to a periodicity of the TDM communication pattern, a parameter related to a duty cycle of the activated periods of the TDM communication pattern, or a combination thereof.

15. The method of claim 13, wherein the one or more TDM parameters include a parameter related to a puncturing pattern within a given activated period of the TDM communication pattern.

16. The method of claim 13, wherein the monitoring comprises:
monitoring the medium for non-first-RAT signaling energy; and
comparing the monitored non-first-RAT signaling energy with a known waveform signature corresponding to the second RAT to associate the signaling with the second RAT.

17. The method of claim 13, wherein the monitoring comprises:
monitoring the medium for non-first-RAT signaling energy; and
correlating the monitored non-first-RAT signaling energy with a channel reservation message defined for the first RAT to associate the signaling with the second RAT.

18. The method of claim 17, wherein the determining comprises determining a duty cycle TDM parameter based on a duration field of the channel reservation message.

19. The method of claim 13, wherein the one or more transmission parameters include a data rate parameter, a Modulation and Coding Scheme (MCS) parameter, a user scheduling parameter, or a combination thereof.

20. The method of claim 13, wherein the one or more transmission parameters include one or more bandwidth management parameters for the first RAT.

21. The method of claim 20, wherein the setting comprises setting the one or more bandwidth management parameters to direct the transceiver to use a first bandwidth during an activated period of the TDM communication pattern and a second bandwidth during a deactivated period of the TDM communication pattern, the first bandwidth being smaller than the second bandwidth.

22. The method of claim 20, wherein the setting comprises setting the one or more bandwidth management parameters to direct the transceiver to send a packet having a priority above a threshold over a restricted portion of the medium during an activated period of the TDM communication pattern.

23. The method of claim 13, wherein the setting comprises maintaining (i) a first set of transmission parameters for the activated periods of the TDM communication pattern and (ii) a second set of transmission parameters for the deactivated periods of the TDM communication pattern.

24. The method of claim 13, wherein:
the medium comprises one or more time, frequency, or space resources on an unlicensed radio frequency band;
the first RAT comprises Wi-Fi technology; and
the second RAT comprises Long Term Evolution (LTE) technology.

25. An apparatus for managing operation on a communication medium shared between Radio Access Technologies (RATs), comprising:

means for monitoring the medium, in accordance with a first RAT, for signaling associated with a second RAT;
means for determining one or more Time Division Multiplexing (TDM) parameters of a TDM communication pattern associated with the second RAT based on the monitored signaling, the TDM communication pattern defining activated periods and deactivated periods of communication over the medium in accordance with the second RAT;
means for setting one or more transmission parameters for the first RAT based on the determined one or more TDM parameters; and
means for transmitting on the medium in accordance with the one or more transmission parameters.

26. The apparatus of claim 25, wherein the one or more TDM parameters include a parameter related to a periodicity of the TDM communication pattern, a parameter related to a duty cycle of the activated periods of the TDM communication pattern, or a combination thereof.

27. The apparatus of claim 25, wherein the one or more TDM parameters include a parameter related to a puncturing pattern within a given activated period of the TDM communication pattern.

28. The apparatus of claim 25, wherein the means for monitoring comprises:
means for monitoring the medium for non-first-RAT signaling energy; and
means for comparing the monitored non-first-RAT signaling energy with a known waveform signature corresponding to the second RAT to associate the signaling with the second RAT.

29. The apparatus of claim 25, wherein the means for monitoring comprises:
means for monitoring the medium for non-first-RAT signaling energy; and
means for correlating the monitored non-first-RAT signaling energy with a channel reservation message defined for the first RAT to associate the signaling with the second RAT.

30. The apparatus of claim 29, wherein the means for determining comprises means for determining a duty cycle TDM parameter based on a duration field of the channel reservation message.

31. The apparatus of claim 25, wherein the one or more transmission parameters include a data rate parameter, a Modulation and Coding Scheme (MCS) parameter, a user scheduling parameter, or a combination thereof.

32. The apparatus of claim 25, wherein the one or more transmission parameters include one or more bandwidth management parameters for the first RAT.

33. The apparatus of claim 32, wherein the means for setting comprises means for setting the one or more bandwidth management parameters to direct the means for transmitting to use a first bandwidth during an activated period of the TDM communication pattern and a second bandwidth during a deactivated period of the TDM communication pattern, the first bandwidth being smaller than the second bandwidth.

34. The apparatus of claim 32, wherein the means for setting comprises means for setting the one or more bandwidth management parameters to direct the means for transmitting to send a packet having a priority above a threshold over a restricted portion of the medium during an activated period of the TDM communication pattern.

35. The apparatus of claim 25, wherein the means for setting comprises means for maintaining (i) a first set of transmission parameters for the activated periods of the TDM communication pattern and (ii) a second set of transmission parameters for the deactivated periods of the TDM communication pattern.

36. The apparatus of claim 25, wherein:
the medium comprises one or more time, frequency, or space resources on an unlicensed radio frequency band;
the first RAT comprises Wi-Fi technology; and
the second RAT comprises Long Term Evolution (LTE) technology.

37. A non-transitory computer-readable medium comprising code, which, when executed by a processor, causes the processor to perform operations for managing operation on a communication medium shared between Radio Access Technologies (RATs), the non-transitory computer-readable medium comprising:
code for monitoring the communication medium, in accordance with a first RAT, for signaling associated with a second RAT;
code for determining one or more Time Division Multiplexing (TDM) parameters of a TDM communication pattern associated with the second RAT based on the monitored signaling, the TDM communication pattern defining activated periods and deactivated periods of communication over the communication medium in accordance with the second RAT;
code for setting one or more transmission parameters for the first RAT based on the determined one or more TDM parameters; and
code for transmitting on the communication medium in accordance with the one or more transmission parameters.

38. The non-transitory computer-readable medium of claim 37, wherein the one or more TDM parameters include a parameter related to a periodicity of the TDM communication pattern, a parameter related to a duty cycle of the activated periods of the TDM communication pattern, or a combination thereof.

39. The non-transitory computer-readable medium of claim 37, wherein the one or more TDM parameters include a parameter related to a puncturing pattern within a given activated period of the TDM communication pattern.

40. The non-transitory computer-readable medium of claim 37, wherein the code for monitoring comprises:
code for monitoring the communication medium for non-first-RAT signaling energy; and
code for comparing the monitored non-first-RAT signaling energy with a known waveform signature corresponding to the second RAT to associate the signaling with the second RAT.

41. The non-transitory computer-readable medium of claim 37, wherein the code for monitoring comprises:
code for monitoring the communication medium for non-first-RAT signaling energy; and
code for correlating the monitored non-first-RAT signaling energy with a channel reservation message defined for the first RAT to associate the signaling with the second RAT.

42. The non-transitory computer-readable medium of claim 41, wherein the code for determining comprises code for determining a duty cycle TDM parameter based on a duration field of the channel reservation message.

43. The non-transitory computer-readable medium of claim 37, wherein the one or more transmission parameters include a data rate parameter, a Modulation and Coding Scheme (MCS) parameter, a user scheduling parameter, or a combination thereof.

44. The non-transitory computer-readable medium of claim 37, wherein the one or more transmission parameters include one or more bandwidth management parameters for the first RAT.

45. The non-transitory computer-readable medium of claim 44, wherein the code for setting comprises code for setting the one or more bandwidth management parameters to direct the code for transmitting to use a first bandwidth during an activated period of the TDM communication pattern and a second bandwidth during a deactivated period of the TDM communication pattern, the first bandwidth being smaller than the second bandwidth.

46. The non-transitory computer-readable medium of claim 44, wherein the code for setting comprises code for setting the one or more bandwidth management parameters to direct the code for transmitting to send a packet having a priority above a threshold over a restricted portion of the communication medium during an activated period of the TDM communication pattern.

47. The non-transitory computer-readable medium of claim 37, wherein the code for setting comprises code for maintaining (i) a first set of transmission parameters for the activated periods of the TDM communication pattern and (ii) a second set of transmission parameters for the deactivated periods of the TDM communication pattern.

48. The non-transitory computer-readable medium of claim 37, wherein:
the communication medium comprises one or more time, frequency, or space resources on an unlicensed radio frequency band;
the first RAT comprises Wi-Fi technology; and
the second RAT comprises Long Term Evolution (LTE) technology.

49. An apparatus for managing operation on a communication medium shared between Radio Access Technologies (RATs), comprising:
a transceiver configured to operate in accordance with a first RAT and to monitor the medium for signaling associated with a second RAT;
at least one processor; and
at least one memory coupled to the at least one processor, the at least one processor and the at least one memory being configured to:
determine one or more Time Division Multiplexing (TDM) parameters of a TDM communication pattern associated with the second RAT based on the monitored signaling, the TDM communication pattern defining activated periods and deactivated periods of communication over the medium in accordance with the second RAT, and
set one or more transmission parameters for the first RAT based on the determined one or more TDM parameters,
wherein the transceiver is further configured to transmit on the medium in accordance with the one or more transmission parameters.

* * * * *